July 1, 1924.

R. RÜDENBERG

ELECTRIC MACHINE

Filed June 1, 1921

Inventor:
Reinhold Rüdenberg
by Knight Bros
his attys.

Patented July 1, 1924.

1,499,695

UNITED STATES PATENT OFFICE.

REINHOLD RÜDENBERG, OF BERLIN-CHARLOTTENBURG, GERMANY, ASSIGNOR TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

ELECTRIC MACHINE.

Application filed June 1, 1921. Serial No. 474,206.

*To all whom it may concern:*

Be it known that I, REINHOLD RÜDENBERG, a citizen of the German Empire, residing at Berlin-Charlottenburg, Germany, have invented certain new and useful Improvements in Electric Machines, of which the following is a specification.

My invention refers to electric machinery and more especially to the conductors arranged within the circumferential slots of an electric machine. Its particular object is to prevent the formation of eddy currents within such conductors.

In alternating current machines in which large currents are carried by slot conductors of large dimensions lying in deep slots large eddy currents occur in the slot conductors in consequence of the action of the slot cross field produced by the current itself, which eddy currents may cause a crowding out of the current towards the edge of the slot whereby great additional losses are occasioned. It is known that these eddy currents may be decreased by a subdivision and interlacing of the conductors. For instance, a current carrying conductor filling up the whole of the slot has been subdivided into several conductors which are insulated from one another only to a small extent so that no eddy currents can be produced and the conductors in two slots are interlaced with one in such a way that the sequence of the conductors is reversed.

The arrangement hereinbefore referred to, however, is not sufficient for fully preventing the formation of eddy currents. This can only be attained in such manner that each subdivided conductor in the slot takes each one of the possible positions so that no subdivided conductor has more prominent positions with respect to the others. This has been attained by standing together the conductors in the slots.

Another expedient, applied in case more than three subdivided conductors are connected in parallel, consists in interlacing each two or three conductors with one another and in interlacing also the groups of conductors thus formed.

Finally an arrangement has also been proposed according to which each bar assumes all the heights in the slot and that for each height it is axially displaced for a portion of its length, this being attained by sufficiently often interlacing the conductor within the slot or by varying the arrangements of the front connection, three conductors being led at different heights to the upper layer and then by a fork connection the series of conductors in the lower layer being symmetrically disposed with respect to the upper layer.

The arrangement last referred to has disadvantages appearing during the manufacture, since the front bundles must be differently formed, whilst interlacings within the slot lead to difficult methods of manufacture and finally stranding of the conductors inside the slot in view of the inclined position of the conductors permits of obtaining only an imperfect electric utilization of conducting material.

These disadvantages are now overcome by the reduction of the crowding out of the current flowing through conductors embedded in slots in electric machines in which the conductors which are insulated from one another with respect to their height are subdivided and in which the conductors outside the slot are changed over in such a manner that a conductor assumes every height in the slot, and according to the invention the displacement of the conductors is effected by means of a kind of front connections by which the conductors between the individual slots are twisted at the same displacement pitch by cyclic interchanging. The interlacing of the conductor therefore is effected outside the slot in the front connections, whilst the subdivided conductors run parallel with one another inside each slot. The winding, the conductors of which fills up the whole of the slot, therefore consists of branches connected in parallel the number of which is equal to the number of the subdivided conductors arranged one above the other or equal to a multiple thereof, and whereby each branch consists of an equal number of winding lengths corresponding to the number of slots.

My invention is illustrated in the accompanying drawing in which—

Figure 1 represents a cross-section through the slot conductors as a modification in which each slot conductor consists of six superimposed partial conductors;

Figure 1ª represents diagrammatically in perspective fashion a portion of the winding located in three consecutive slots arranged in accordance with Figure 1;

Figure 1:
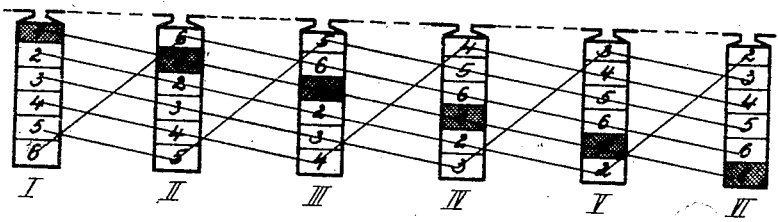
Fig. 1 illustrates an arrangement according to the invention. Therein it is assumed that six subdivided conductors 1, 2, 3, 4, 5, 6, are connected in parallel and constitute a complete conductor per slot.
Figure 1A:
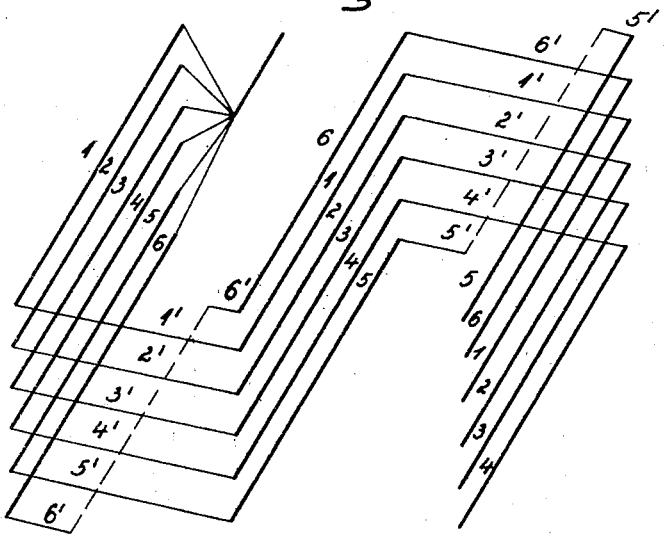

The whole of the winding consists of six branches or sections connected in parallel, each of which sections consists of six winding lengths or conductors arranged in series with one another, the number of slots being equal for each branch of the winding. The conductors pertaining to a winding length of the slots I to VI are indicated with the same reference numerals 1, 2 and so on. When going from one winding length over to the next one—or in case a winding length consists only of one conductor in a slot, when going over from one slot to another—a cyclic displacement of the series of subdivided conductors takes place.

This cyclic displacement is obtained as follows:—

Figure 8:
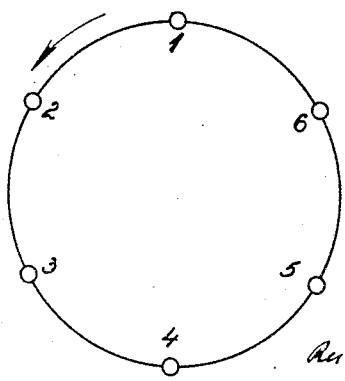
Figure 8 shows a diagram explaining the cyclic displacement of the partial conductors.

Let us assume that the subdivided conductors in the slot are numbered consecutively, for instance in Fig. 1 beginning from the top 1 to 6 in the first slot, or in the other figures in which each two subdivided conductors lie adjacent to one another, in the left hand half from the top downwards, and in the right hand half from below upwards, so that for instance, as will be seen from Fig. 3, the numbering is effected in the left hand half from the top downwards, viz., 1–3, and in the right hand half from below upwards, viz., 4–6. Let us now assume these numbers to be arranged in a circle, as is shown in Fig. 8, which represents a single coil, wave wound, winding having one slot per pole per phase and six subdivided conductors arranged one above the other in the slot. This circle would then give the diagram for the sequence of the subdivided conductors in the slot. The arrangement of the subdivided conductors in the next slot is arrived at by displacing the numbers on the circle either in a clockwise or in a counter-clockwise direction.

Thus in Fig. 8 the numbers 1–6 by which the subdivided conductors, superposed in the slot are designated, are uniformly distributed over the circle, and in the first slot, it is assumed that the sub-conductor 1 is at the top. This condition would be represented by numeral 1 in Fig. 1. If it is now desired to have between the first and the second slot a cyclic displacement of the sub-conductors of one step, one should assume the circle, Fig. 8 turned counter-clockwise in the direction of the arrow for one-sixth of its circumference, so that numeral 6 takes the place of numeral 1. This will then indicate that in this second slot the sub-conductors counted from the top to the bottom are to be arranged in the sequence 6, 1, 2, 3, 4, 5 and so forth.

Now the displacement for each subsequent slot through which the winding has to pass next is carried out with the same pitch and in the same direction. Thus if the numbers given in Fig. 1, are for instance, displaced to the extent of one sixth of the periphery, in the counter-clockwise direction indicated by the arrow in Fig. 8 one obtains consecutively the arrangement of the subdivided conductors in the slots II, III, IV, and so on, indicated in Fig. 1, viz., the arrangement of conductors 6, 1, 2, 3, 4, 5—5, 6, 1, 2, 3, 4—4, 5, 6, 1, 2, 3, and so on. If the displacement is effected in the opposite direction, the sequence of the subdivided conductors in the slot II, will be 2, 3, 4, 5, 6, 1; in the slot III it will be 3, 4, 5, 6, 1, 2; in the slot IV, 4, 5, 6, 1, 2, 3, and so on. Naturally the sequence of the subdivided conductors may be effected in the opposite direction so that for instance, the following sequence of conductors is obtained.

In slot I, 6, 5, 4, 3, 2, 1.
In slot II, 5, 4, 3, 2, 1, 6.
In slot III, 4, 3, 2, 1, 6, 5 and son on, or
In slot I, 1, 6, 5, 4, 3, 2.
In slot II, 2, 1, 6, 5, 4, 3.
In slot III, 3, 2, 1, 6, 5, 4.
In slot IV, 4, 3, 2, 1, 6, 5 and so on.

Figure 3:
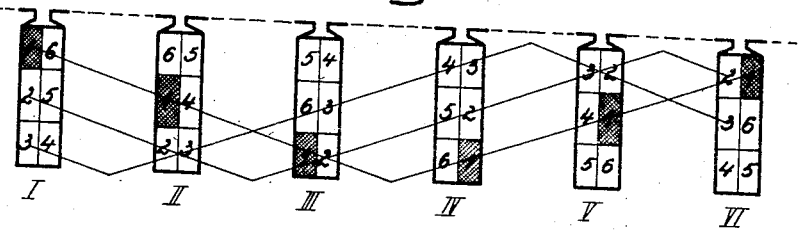
Figure 3 represents a modification having six partial conductors arranged in two adjacent rows each having three superposed partial conductors.

Such displacements are illustrated in Fig. 1 for a slot with one conductor that has been subdivided filling up the width of the slot and in Fig. 3 with two subdivided conductors arranged horizontally side by side in the slot. However, it is possible to choose the displacement pitch, that was given as 1 in the example hereinbefore described, greater than 1, for instance 2, in which case the following sequence of subdivided conductors is obtained:—

In slot I, 1, 2, 3, 4, 5, 6.
In slot II, 5, 6, 1, 2, 3, 4.
In slot III, 3, 4, 5, 6, 1, 2 (see Fig. 4).

It will thus be seen that the arrangement of the conductors in consecutive slots, between which the displacement has to be effected is obtained by cyclic displacement of the consecutive numbers of the diagram. As the displacement is effected to the same extent, the great advantage is obtained, that a single form of end connections is sufficient for the displacement, all of these connections being of the same form.

This will be clearly seen from the diagram Fig. 1$^a$ which illustrates part of a winding subdivided into six conductors passing through three of the six consecutive slots shown in Fig. 1, including one front and one rear end connection. This diagram shows that although each part conductor, for instance the part conductor 1, drops by one division from its position in the one slot to its position in the subsequent slot, the two bundles of front and rear end connections $1^1, 2^1, 3^1, 4^1, 5^1, 6^1$ are of identical form and capable of effecting the required displaced connection also between all the subsequent slots.

It is thus sufficient to give to the workman a single diagram for a single end connection. According to the invention the advantages of this arrangement for varying the position of the conductor in the slot with respect to the height thereof—according to which only a single form of end connection is required for the displacement—will clearly be perceived by comparing this arrangement with other known arrangements in which the conductors are also transposed outside the slot in such a manner that each conductor consecutively assumes each one of all the possible positions in the slot with regard to its height.

A further construction with twisted conductors is illustrated in Fig. 3. In this case six conductors of the slot are not arranged one under the other, but two adjacent layers are formed each consisting of three conductors. This arrangement has the advantage that when going over from one branch to the other, the conductors are displaced relatively to one another only for a small distance and need not jump the whole height of the slot. The thin lines shown in all the figures illustrate this clearly. Whilst in Fig. 1 at each point of interlacing a conductor jumps over all the conductors. In Fig. 3 all the conductors are equally displaced in themselves. The cyclic succession is indicated here by the same plan of the numbers. The numbering of the conductors is carried out so that in the lefthand half of the slot I, the conductors are referred to downwards by 1, 2, 3, and in the righthand half upwards by 4, 5, 6. Consequently the succession of the conductors in the slot I is 1, 2, 3, 4, 5, 6; in the slot II 6, 1, 2, 3, 4, 5 and so on.

Figure 6:
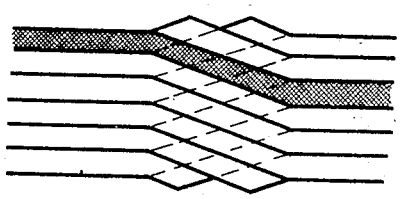
Figure 6 represents a side elevation of the displacement of the end connections of the partial conductors shown in Figure 5.

Fig. 6 illustrates the point of interlacing when going over from one winding length to the next one for a similiar bundle of conductors. It will be seen from this figure that such an interlacing point has great advantages for the rigid construction of the front connections.

Figure 2:
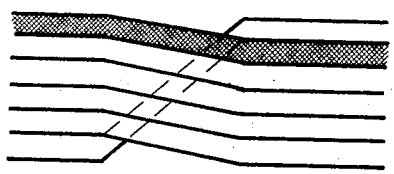
Figure 2 represents in side elevation the displacement of the partial conductors which may be located at any suitable place along the end connections.

In the arrangement according to Figs. 1 and 2 the displacement pitch of the cyclic interchanging was 1. A substantial simplification of the arrangement is obtained if the displacement pitch of the cyclic interchanging of the position of the subdivided conductors is not made equal to 1 but different therefrom.

Figure 4:
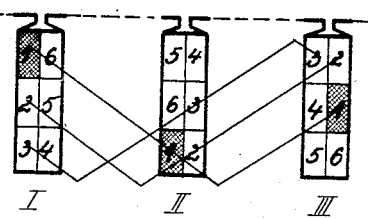
Figure 4 shows a similar arrangement with a different displacement pitch.

Fig. 4 illustrates an arrangement in which the displacement pitch is made equal to 2 by displacing, for instance, each subdivided conductor from the twisted points to the front connections by a distance equal to twice the width of the subdivided conductors. The following scheme is then obtained:

Slot I—1, 2, 3, 4, 5, 6.
Slot II—5, 6, 1, 2, 3, 4.
Slot III—3, 4, 5, 6, 1, 2.

Fig. 4 shows that also in this case each subdivided conductor assumes all the positions in the slot an equal number of times.

Figure 5:
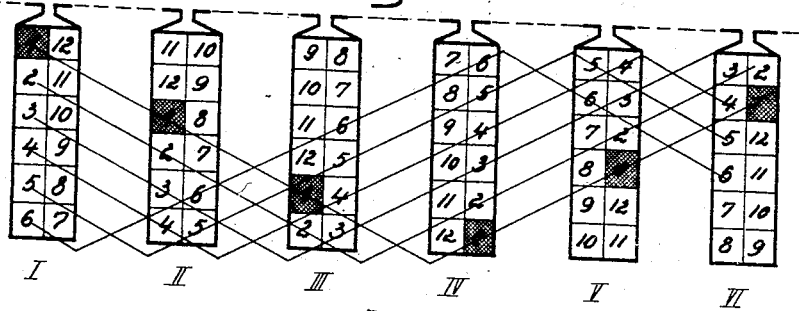
Figure 5 shows a vertical double row of twelve partial conductors in cross-section.

A corresponding arrangement for 12 subdivided conductors in a slot whereby six conductors are arranged above one another is illustrated in Fig. 5.

Corresponding to the six conductors arranged above one another, six winding lengths connected in series with one another are here required.

Fig. 6 illustrates the twisting point of the 12 conductors according to Fig. 5. The displacement pitch in this arrangement is also made equal to 2 so that the scheme now obtained is:

Slot I—1, 2, 3, 4, 5, 6, 7, 8, 9, 10, 11, 12,
Slot II—11, 12, 1, 2, 3, 4, 5, 6, 7, 8, 9, 10,
and so on.

The number of the subdivided conductors into which the whole of the conductor in the slots is subdivided is determined in practice on the one side by the flexibility that is at one's disposal and which is required for the formation of the winding: on the other hand by the thickness of the copper which with respect to the dimensions of the slot can be used without too great eddy current losses. When use is made of copper strands the first feature is the most important one and when use is made of solid copper it is the second feature that is the determining factor. In the case of very deep slots of alternating current machines, use may be made in case of need of thirty solid subdivided conductors which are carried above one another. Finally the number of the subdivided conductors must be chosen so as to be equal to the number of the similar branches or a fraction thereof into which each winding has to be subdivided. The highest number of these branches is determined by the number of the slots which are connected in series with one another. Since the number of the slots in the case of larger machines is in most cases very great, it will be seen that by the arrangements hereinbefore referred to great subdivisions are rendered possible with a perfect twisting of the conductors.

Figure 7:
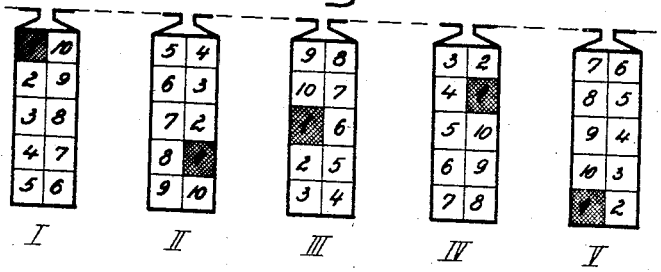
Figure 7 shows in section a modification having ten partial conductors disposed in two adjacent vertical rows and having a larger displacement pitch than that shown in Figure 5.

In most cases is will be sufficient to subdivide the windings into a small number of branches, for instance, 3, 4, 5 or 6, since sufficiently small dimensions of the subdivided conductors are thereby obtained very often. In that case each branch contains a series of slots which are connected in series with one another. A further suitable displacement for the cyclic interchanging of the layers of the subdivided conductors is illustrated in Fig. 7; this arrangement comes into question when the number of the subdivided conductors arranged one above the other is an odd one. In this case the displacement pitch that is used is $n/2-1$, wherein $n$ is the total number of the subdivided conductors in the slot and therefore $n/2$ the number of the conductors which are arranged one above the other in a layer. In the case of 10 conductors in the slot the diagram shown in Fig. 7 is obtained:

Slot I—1, 2, 3, 4, 5, 6, 7, 8, 9, 10.
Slot II—5, 6, 7, 8, 9, 10, 1, 2, 3, 4.
Slot III—9, 10, 1, 2, 3, 4, 5, 6, 7, 8.
Slot IV—3, 4, 5, 6, 7, 8, 9, 10, 1, 2.
Slot V—7, 8, 9, 10, 1, 2, 3, 4, 5, 6.

Also in this case there is a complete mixing of all the parts. This displacement through a displacement pitch of $n/2-1$ applies only in the case of an odd number of subdivided conductors arranged one above the other in a slot to an arrangement in which the winding lengths belonging to a branch lie at the different heights in the various slots. If, for some reason or other, it is not possible to use an odd number of subdivided conductors or winding lengths, the odd number is chosen for the number of winding lengths but the number of the branches is made double the number of the subdivided conductors, arranged one above the other.

The subdivision of the conductors in two adjacent groups which are illustrated in Figs. 3 to 7 has a further advantage, more especially in the case of open slots, that also the longitudinal slot field which in greatly utilized machines may have very high values can cause the production of eddy currents only to a small extent. All the arrangements hereinbefore referred to have the advantage that they not only suppress the eddy currents originated from the slot fields but also the substantial eddy current losses which occur in the case of large machines and which originate from the stray fields of the front connections of the winding. In all cases the subdivided conductors need have only a small insulation so as to prevent the action of the inner voltages. For this purpose a thin lacquering or enamelling of the separate conductors in sufficient.

I claim:

1. An armature having a slotted core and conductors embedded in said slots and subdivided into a plurality of partial conductors insulated from each other and disposed above each other with respect to the height of the slot, said partial conductors being displaced outside the slot in such manner that each conductor consecutively assumes each one of all the positions in the slot regarding the height thereof, each of said partial conductors being cyclically displaced relatively to the others in similar geometrical configuration at the same displacement pitch, permitting the use of the same form of end connections for all displaced conductors.

2. An armature having a slotted core and conductors embedded in said slots and subdivided into a plurality of partial conductors insulated from each other and disposed in two adjacent parallel rows above each other with respect to the height of the slot, said partial conductors being displaced outside the slot in such manner that each conductor consecutively assumes each one of all the positions in the slot regarding the height thereof, each of said partial conductors being cyclically displaced relatively to the others in similar geometrical configuration at the same displacement pitch, permitting the use of the same form of end connections for all displaced conductors.

3. An armature having a slotted core and conductors embedded in said slots and subdivided into a plurality of partial conductors insulated from each other and disposed in two adjacent parallel rows above each other with respect to the height of the slot, said partial conductors being displaced outside the slot in such manner that each conductor consecutively assumes each one of all the positions in the slot regarding the height thereof, each of said partial conductors being cyclically displaced relatively to the others in similar geometrical configuration at the same displacement pitch, permitting the use of the same form of end connections for all displaced conductors, in case of an odd number of partial conductors, in the height of the slot, the displacement pitch of said conductors at the points of displacement of the end connections being equal to $$\frac{n}{2}-1,$$

wherein $n$ represents the number of subdivided conductors.

4. An armature having a slotted core and conductors embedded in said slots and subdivided into a plurality of partial conductors insulated from each other and disposed in two adjacent parallel rows above each other with respect to the height of the slot, said partial conductors being displaced outside the slot in such manner that each conductor consecutively assumes each one of all the positions in the slot regarding the height thereof, each of said partial conductors being cyclically displaced relatively to the others in similar geometrical configuration at the same displacement pitch, permitting the use of the same form of end connections for all displaced conductors, in case of an odd number of partial conductors, in the height of the slot, the displacement pitch of said conductors at the points of displacement of the end connections being equal to $$\frac{n}{2}-1,$$

wherein $n$ represents the number of subdivided conductors, the number of the winding branches being made double the number of the partial conductors superimposed upon each other.

In testimony whereof I affix my signature.

REINHOLD RÜDENBERG.